J. COULSON.
ELECTROLYTE.
APPLICATION FILED FEB. 19, 1917.
1,412,513.
Patented Apr. 11, 1922.
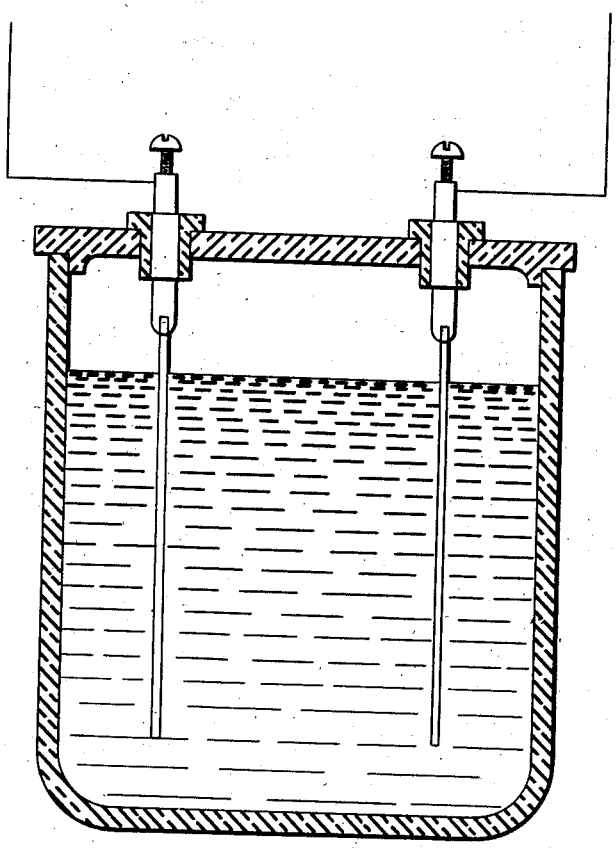
1 to 2% Solution of
Ammonium Carbonate
WITNESSES:
INVENTOR
John Coulson.
BY
ATTORNEY

UNITED STATES PATENT OFFICE.

JOHN COULSON, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTROLYTE.

1,412,513.   Specification of Letters Patent.   Patented Apr. 11, 1922.

Application filed February 19, 1917. Serial No. 149,531.

*To all whom it may concern:*

Be it known that I, JOHN COULSON, a subject of the King of Great Britain, and a resident of Wilkinsburg, in the county of Allegheny and State of Pennsylvania, have invented a new and useful Improvement in Electrolytes, of which the following is a specification.

My invention relates to electrolytes for use in electrolytic cells, such as lightning arresters, condensers, and rectifiers, and it has for its object to provide an electrolyte which shall be capable of acting upon film-forming metals, such as aluminum, magnesium and the like, to produce plates of high electric capacity and to provide the plates with asymmetric conducting films of great endurance when subjected to potentials of considerable magnitude for long periods of time.

Electrolytes for use in cells of the above-indicated character may consist of aqueous solutions of various substances, the value of such substances for this purpose being determined by the electrical characteristics which they impart to the cells, among which are the capacity of the active plates, the endurance of the films upon the plates, the power losses in the cells and the voltages which the films will withstand without rupture.

I have found that the best results are obtained in electrolytic condensers and similar cells, if the electrolyte is dilute, containing preferably 1% or 2% of dissolved material and if the dissolved material comprises both acid and basic radicals. Salts of weak acids and weak bases are better for this purpose than those containing strong acids and bases, and it appears, in general, that the weaker the acid present the better are the characteristics of the cells. Ammonium is the most satisfactory base which I have discovered up to the present time, although salts of other weak bases, such as aluminum, molybdenum, titanium and the like may also be employed with advantage under certain circumstances.

My present invention is concerned with electrolytes of the above indicated character containing salts of carbonic acid, such as ammonium carbonate and ammonium bicarbonate. These carbonates, when employed as electrolytes in condensers, lightning arresters and similar cells, are characterized by low deteriorating effect upon the active plates of the cell, by the high capacity of the active plates, and by the rapidity with which the films are formed upon the plates and are re-formed after being ruptured. The latter property renders these electrolytes particularly well suited for use in electrolytic lightning arresters, since the cells are quickly restored to their normal condition after the films are ruptured by reason of lightning discharges or otherwise.

The capacity of aluminum plates, when immersed in relatively dilute solutions of ammonium carbonate, is about one-fourth greater than the capacity of similar plates immersed in ordinary electrolytes such as ammonium borate and the like. The plates may be continuously subjected to voltages as high as 400 volts when the electrolyte contains about 1% of dissolved material and as high as 360 to 380 volts when the electrolyte contains about 2% of dissolved material. The initial power-factor loss, or the ratio of the watt loss in the cell to the volt-amperes input, with these carbonate electrolytes, is about 8% at operating voltages and with concentrations of the order of 1% to 2%. As is usual in cells of this kind, the power factor loss rises somewhat during continuous operation but does not become excessive.

In the accompanying drawing constituting a part hereof, the single figure is a cross-sectional view of a condenser containing an electrolyte made in accordance with this invention.

The carbonate electrolytes which I have described herein may be used both for initially forming asymmetric conducting films upon plates to be used in electrolytic cells or for the continuous operation of such cells, or both.

While I have herein specifically mentioned certain carbonates and specified certain degrees of concentration and other operating conditions, it is to be understood that these specific references are intended to be merely illustrative of my invention and not as imposing limitations thereon, the scope of my invention being set forth in the appended claims.

I claim as my invention:

1. An electrolyte for electrolytic condensers, lightning arresters, rectifiers and the like comprising an aqueous solution containing less than 2% of ammonium carbonate.

2. An electrolyte for electrolytic condensers, lightning arresters, rectifiers and the like comprising an aqueous solution containing less than 1% of ammonium carbonate.

3. An electrolyte for electrolytic condensers, lightning arresters, rectifiers and the like comprising an aqueous solution containing less than 2% of carbonates of ammonia.

In testimony whereof, I have hereunto subscribed my name this 31st day of January, 1917.

JOHN COULSON.